United States Patent [19]
Sampson

[11] Patent Number: 5,561,971
[45] Date of Patent: Oct. 8, 1996

[54] PORTABLE ROUND BALE WRAPPER

[76] Inventor: Roy E. Sampson, Box 351, Lumberport, W. Va. 26386

[21] Appl. No.: 530,732

[22] Filed: Sep. 19, 1995

[51] Int. Cl.$^6$ .......................... B65B 53/00; B65B 67/00; B65B 27/12

[52] U.S. Cl. ............................ 53/556; 53/588; 53/592; 53/390

[58] Field of Search .................................. 53/210, 389.2, 53/390, 556, 588, 592

[56] References Cited

U.S. PATENT DOCUMENTS

| | | |
|---|---|---|
| 3,910,005 | 10/1975 | Thimon et al. . |
| 4,209,961 | 7/1980 | Donnelley ................................ 53/588 |
| 4,369,614 | 1/1983 | Tetzner . |
| 4,409,784 | 10/1983 | VanGinhoven et al. . |
| 4,522,348 | 6/1985 | Strout et al. . |
| 4,533,374 | 11/1985 | Lancaster et al. . |
| 4,616,474 | 10/1986 | Moreley et al. . |
| 4,827,699 | 5/1989 | Shauman . |
| 4,827,700 | 5/1989 | Rampe et al. . |
| 4,972,656 | 11/1990 | Haugstad . |
| 4,986,057 | 1/1991 | Gainforth . |

FOREIGN PATENT DOCUMENTS

| | | | |
|---|---|---|---|
| 70549 | 1/1983 | European Pat. Off. ................. | 53/556 |
| 2810124 | 9/1978 | Germany ................................ | 53/210 |
| 3203646 | 8/1983 | Germany ................................ | 53/390 |
| 2159489 | 4/1985 | United Kingdom . | |
| WO93/07059 | 4/1993 | WIPO . | |

*Primary Examiner*—Linda Johnson
*Attorney, Agent, or Firm*—Richard C. Litman

[57] ABSTRACT

A portable round bale wrapping apparatus which wraps large upright cylindrical straw bales with protective plastic film for storage on the field. One person can operate the wheeled bale wrapper on uneven ground. A light-weight tubular frame with a pulley system moves the wrapper roll up and down. The rotation of wrapping can be reversed by moving the pulley system to an opposite side. The wrapping apparatus can be adjusted in height and length to accommodate the variance in size of hay or straw bale. The bale wrapping apparatus can be dismantled, folded into a light-weight package and carried to the next field or stored.

20 Claims, 5 Drawing Sheets

PORTABLE ROUND BALE WRAPPER

BACKGROUND OF THE INVENTION

1. Field of the Invention

The present invention relates to a portable bale wrapper for covering round straw or hay bales for outside storage in the field. The apparatus is light-weight but durable in rotating around hay bales during the wrapping process. The apparatus can be readily operated by one person, easily moved to the next bale on one of its wheels, and quickly dismantled for transport to the next remote area and rebuilt for use.

Farmers bale hay in the field in cylindrical forms which are left in the fields for as long as several years and accessed for animal feed or fodder when desired. The problem of spoilage arises because of the failure to cover these hay bales effectively due to the expensive cost of owning or renting hay bale covering machinery. Therefore, farmers will leave their bales in the field and encounter increased spoilage, as much as one-third, due to exposure to rain and snow. The farmer must then scrape off the snow or chop through the frozen hay with an axe because the farm animals will only eat the centers of the hay bales, thus wasting at least half the stored hay. The normal practice is to cover bales with a plastic sheet around the sides and leave the ends open. The bales are then placed end to end to minimize exposure of the ends.

Therefore, there exists a need for an round bale wrapper apparatus for covering hay bales on uneven ground in the field which is relatively inexpensive, light-weight and foldable for extended transport. More importantly, commercial bailers require two people to operate, while the inventive apparatus can be operated with only one person with the following advantages: wrapping speed, e.g., 30 to 40 seconds, wrapping accuracy and a minimum of effort required by the single operator.

2. Description of the Prior Art

The prior art has not considered the necessity for a portable, one-person operable, light-weight round hay bale wrapper. The wrapping operation disclosed by the prior art may be portable but is usually performed indoors and may be associated with heavy machinery such as a vehicle.

The discussion of the prior art patents are considered in the order of their perceived relevance. In U.S. Pat. No. 4,369,614 issued on Jan. 25, 1983, to Siegfried K. Tetzner, an apparatus for wrapping a load of cartons carried on a floor-mounted pallet consisting of a carriage on a wheeled base is described. An upright member supports a carrier for a roll of wrapping paper, which carrier is moved vertically along the upright member by a cable supplied from a drum and transported over several rollers. However, Tetzner neither suggests nor discloses the need for any structural member attached to the center of the rectangular load's top surface.

In U.S. Pat. No. 4,986,057 issued on Jan. 22, 1991, to Douglas Gainforth, an apparatus for covering twine wrapped hay bales is described. The L-shaped frame consists of a roll of wrapping material positioned on the horizontal member above a horizontal probe having a steel rod twisted along the probe, which probe supports a cylindrical bale of hay. The insertion of the probe, rotation of the bale and the removal of the probe is performed by powered means. The wrapping material, polyethylene film having a thickness of 1.2 mm., an unstretched length of 5,000 feet and including ultraviolet radiation inhibitors is hereby incorporated by reference. The roll of wrapping material is sized proportionately for the length of the bale, i.e., the width of the plastic sheet equals the length of the bale being covered.

In U.S. Pat. No. 4,616,474 issued on Oct. 14, 1986, to Edmond Morley et al., a mobile film wrapping apparatus is attached to a self propelled vehicle, i.e., a forklift, and powered by the vehicle's electrical power supply. The plastic film is dispensed from a supply roll to a heated roller before wrapping the load having the same height as the length of the supply roll.

Various bale wrapping machinery which involve heavy intricate equipment are described in U.S. Pat. No. 4,409,784 issued on Oct. 18, 1983, to Robert M. VanGinhoven et al.; U.S. Pat. No. 4,827,699 issued on May 9, 1989, to Kevin J. Shauman; U.S. Pat. No. 4,827,700, issued on May 9, 1989 to Donald H. Rampe et al.; U.S. Pat. No. 4,972,656 issued on Nov. 27, 1990, to Jahn E. Haugstad; U.K. Patent Application No. 2,159,489A published on Dec. 4, 1985, for Kenneth Williamson; and PCT WO 93/07059 published Apr. 13, 1993, for Ebbe Korsgaard.

Various non-bale loads are wrapped by intricate machinery described by U.S. Pat. Nos. 3,910,005 issued on Oct. 7, 1975, to Hubert A. Thimon et al.; 4,522,348 issued on Jun. 11, 1985, to Russell B. Strout et al.; and 4,553,374 issued on Nov. 19, 1985, to William G. Lancaster et al.

The disclosures of the prior art are incorporated by reference herein. None of the above inventions and patents, taken either singly or in combination, is seen to describe the instant invention as claimed.

SUMMARY OF THE INVENTION

Accordingly, it is a principal object of the invention to provide an apparatus for wrapping hay or straw bales with a plastic film for curing and silage.

It is another object of the invention to provide a bale wrapping apparatus which is inexpensive, light-weight, adjustable in height and length, and foldable.

It is a further object of the invention to provide a bale wrapping apparatus which can be carried to the hay field and operated by one person on uneven ground.

Still another object of the invention is to provide a bale wrapping apparatus which enables the reversal of the pulleys and the hand winder from one side to the opposite side of the apparatus to reverse the direction of rotation in the wrapping process.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENT

Figure 1:
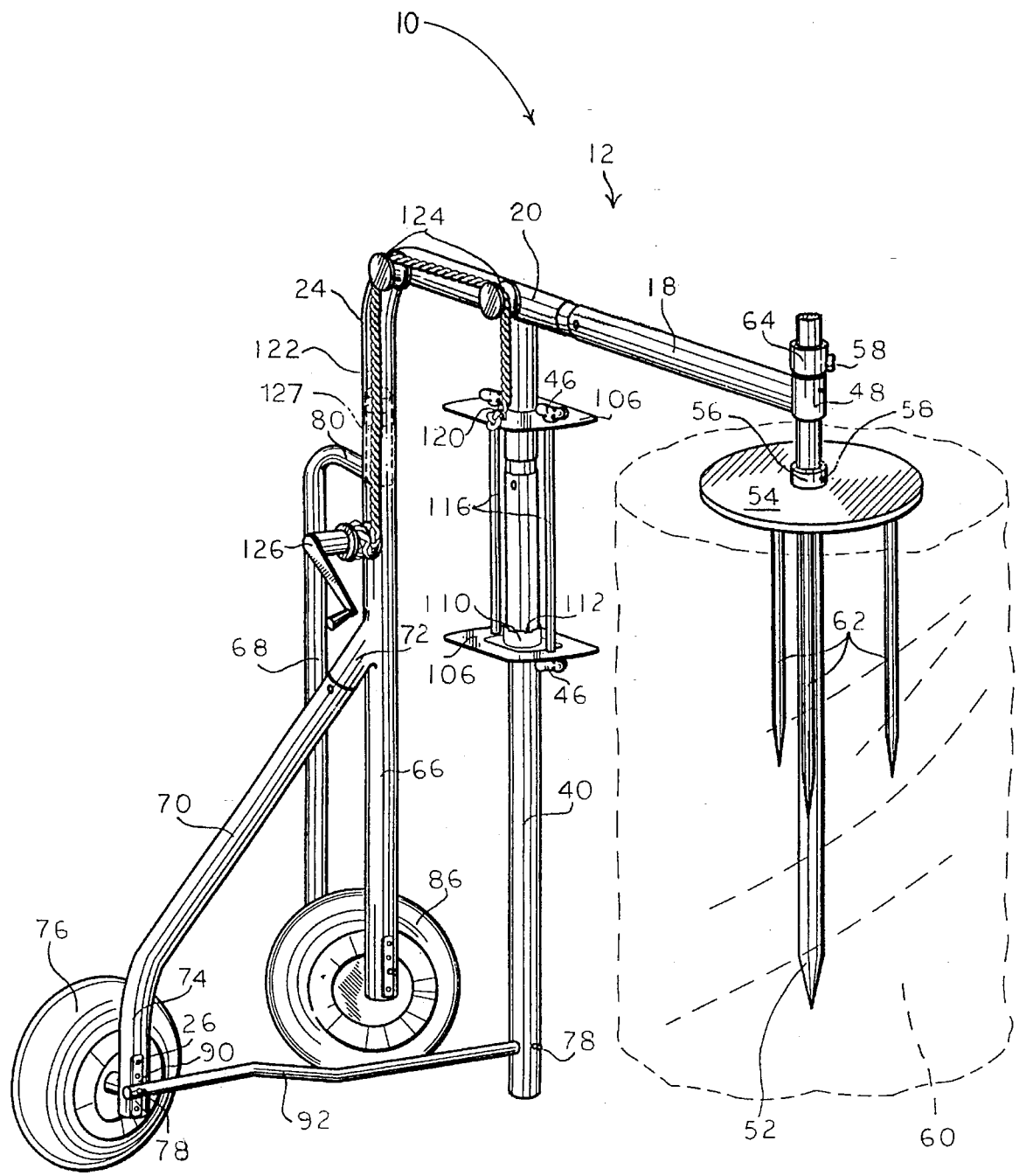
FIG. 1 is an environmental perspective view of the bale wrapping apparatus with a hay bale in shadow line.

The present invention provides a portable bale wrapper for covering round bales of hay or straw for storage in the hay field as long as several years. The light-weight apparatus is wheeled, collapsible and readily bundled for transport. A single person can operate the apparatus in wrapping a hay bale from the top to the bottom. The roll of plastic film is dispensed from a carrier or holder which is lowered by means of either a pulley and crank system or a hand brake in the form of a length of garden hose. The pulleys and crank can readily be transferred to an opposite side when wrapping a bale in the opposite direction.

In FIGS. 1–5, the round bale wrapping apparatus 10 comprises a tubular frame 12 supporting a bale holding appendage 14. The tubular frame is preferably made of aluminum tubes but plastic tubes are also contemplated. Frame 12 comprises a two-section upper support member 16 which has a first horizontal section member 18 and a second elbowed section member 20 having a vertical member 22 which is proximate to the first horizontal section member 18 and is parallel to the vertical extension member 24 of elbowed section member 20. The two vertical members 22 and 24 are each approximately a foot long having an aligned set of up to five aligned throughbores 26 proximate to their ends 28 and 30, respectively. The tubular frame 12 is adjustable in horizontal length with the end 32 of the second elbowed section member 20 telescoping into the end 34 of the first horizontal section member 18 and secured by a fastener 36 which can be either a cotter pin or a threaded pin, further secured with a wing nut 46. Frame 12 is adjustable in height with the end 28 of vertical leg member 22 telescoping into the upper end 38 of singular leg member 40, and secured by a fastener 36. Similarly, end 30 of the vertical extension member 24 telescopes into the upper end 42 of a three-legged wheeled member 44, wherein the height is adjustably secured by a fastener 36.

A ring 48 at the distal end 50 of the first horizontal section member 18 confines the bale holding appendage 14. Ring 48 is lined with a polytetrafluoroethylene (PTFE) bushing 49 which surrounds an elongated spear 52 located in the center of a circular metal plate 54 and held by a metal collar 56 having a setscrew 58. The spear, preferably metal, approximately 42 inches long and an inch in diameter, is made adjustable in the vertical penetration of the bale 60 by means of the setscrew 58. The spear's penetration is dependent on the tightness of the bale at its center. The bottom of the circular metal plate 54 also holds three shorter spikes 62 which are either welded or bolted proximate the periphery of the circular plate 54 and are equidistant from each other. Spikes 62 are preferably metal and are approximately 7 inches long and ¾ inch in diameter. Since the bale 60 is more tightly bound away from the center, spikes 62 enable greater control by the operator over the bale in the circling of the wrapping apparatus 10 about the bale during the wrapping process. Circular plate 54 made of aluminum is prevented from rising by a metal collar 64 provided with a set screw 58.

Three-legged wheeled member 44 which consists of a first vertical leg member 66, second vertical leg member 68 which is the only tubular frame member with a thinner diameter, e.g., approximately an inch, and a third inclined leg member 70, wherein the first and third members are approximately two inches in diameter as are members 18, 20, 22, and 24. Inclined third leg member 70 fits into an inclined socket 72 and is held by a fastener 36. Inclined member 70 has a lower bent portion 74 which accommodates the front wheel 76 and wheel fastening means 78. Inclined leg member 70 is positioned towards the circular plate 54 approximately 45 degrees from the perpendicular to the horizontal axis of the upper support member 16. This position of the front wheel 76 and the inclined leg member 70 provides for the smooth rotation of the apparatus 10 about the bale 60 during the wrapping operation.

Figure 2:
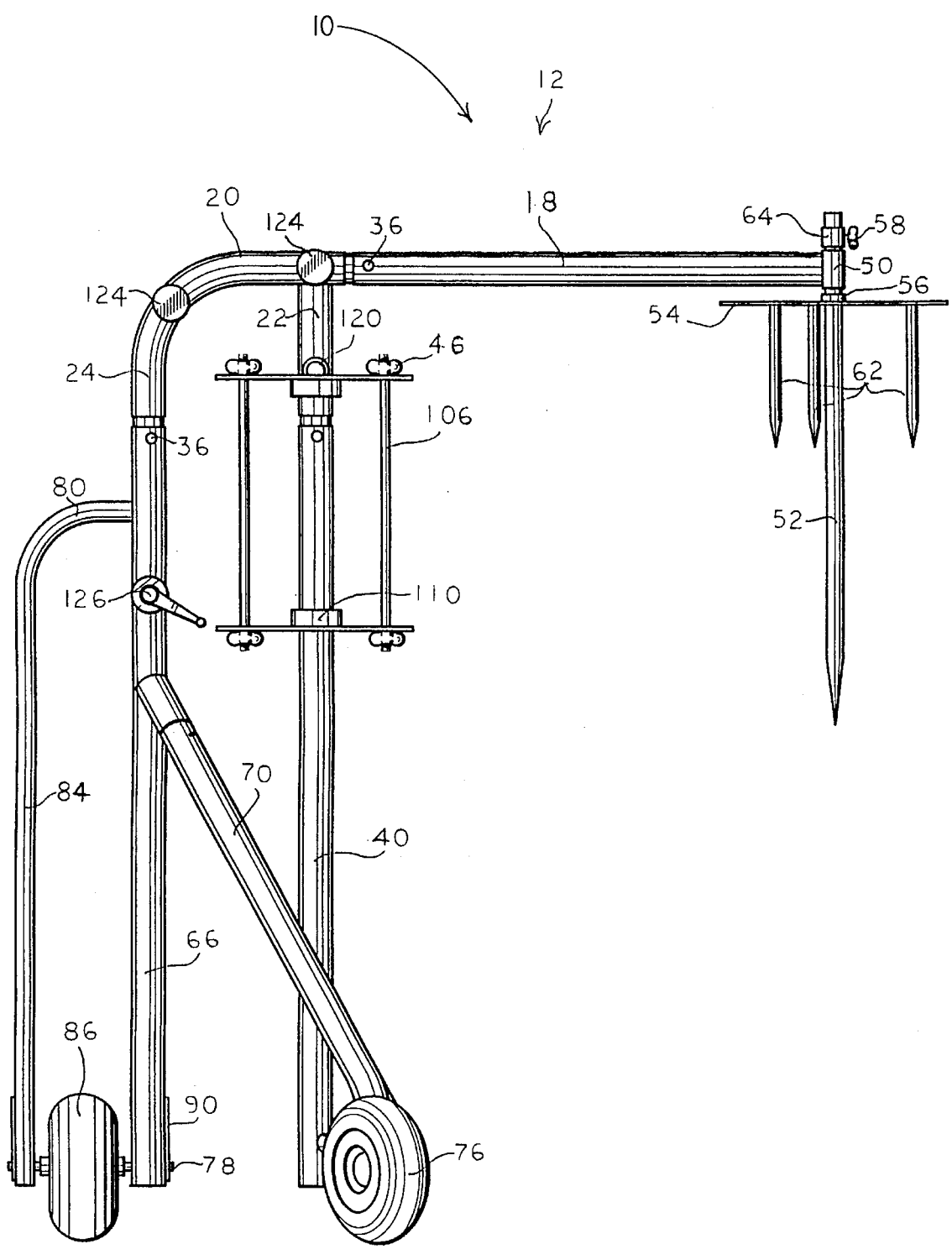
FIG. 2 is a front view of the apparatus.
Figure 5:
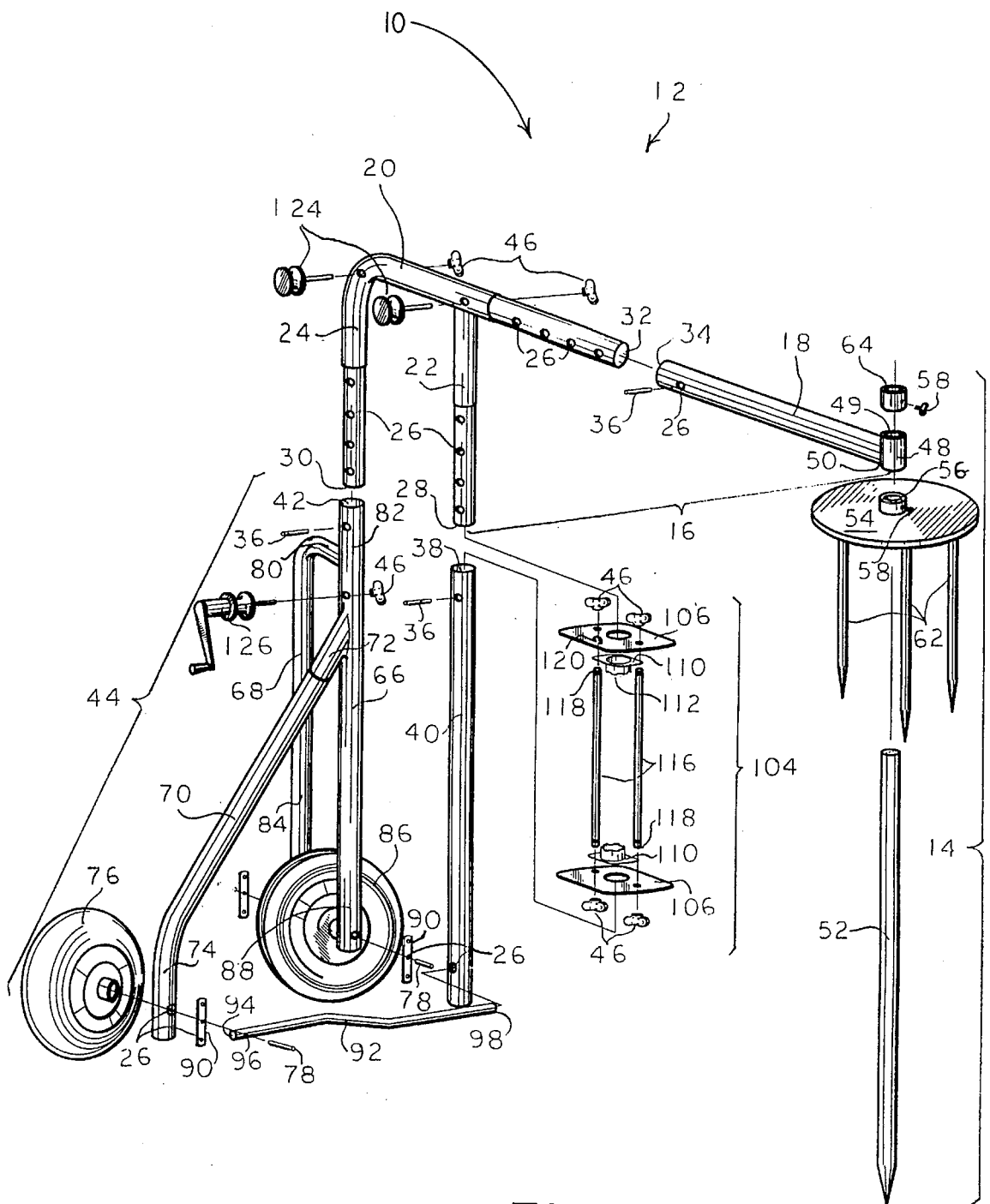
FIG. 5 is an exploded view of the dismantled apparatus.

The second vertical leg member 68 has a horizontal top portion 80 which joins the upper end 82 of the first vertical leg member 66 and a vertical portion 84 which supports the rear wheel 86 near its bottom end 87 along with the first vertical leg member 66 at its bottom end 88 by the wheel fastening means 78. Although the drawing in FIGS. 1, 2 and 5 illustrates a lengthy second vertical leg member 68, the length can be shortened as long as the rear wheel 86 has adequate clearance to rotate. The rear wheel 86 can be adjusted in height by positioning in one of up to five aligned throughbores 26 in the attached (welded or bolted) reinforcement plate 90 positioned on the outside surface of the vertical portion 84 of the second vertical leg member 68. Another reinforcement plate 90 is positioned proximate to the bottom end 88 and outside surface of the first vertical leg 66 and has a series of up to five aligned throughbores 26. As noted above, vertical leg members 66 and 68 support the rear wheel 86. Reinforcement plates 90 can be omitted if the vertical leg members 66 and 68 can resist distortion under a load and frequent use. While the rear wheel 86 is positioned perpendicular to the longitudinal axis of the two-section upper support member 16, the front wheel 76 and its supporting inclined third leg member 70 are aligned approximately 45 degrees towards the circular metal plate 54.

A bent strut member 92 joins inclined third leg member 70 and the vertical member 40 as a reinforcement support. First end 94 of the strut member 92 has an aperture 96 through which wheel fastening means 78, e.g., a threaded bolt or axle, can pass through to support the front wheel 76 and be held fast by a nut or wing nut (not shown). The opposite or second end 98 of the bent strut member 92 is inserted in a throughbore 26 and can be fastened by a fastener 36 (FIG. 1) such as a cotter pin or a wing nut (not shown) if the end 98 is threaded.

Figure 3:
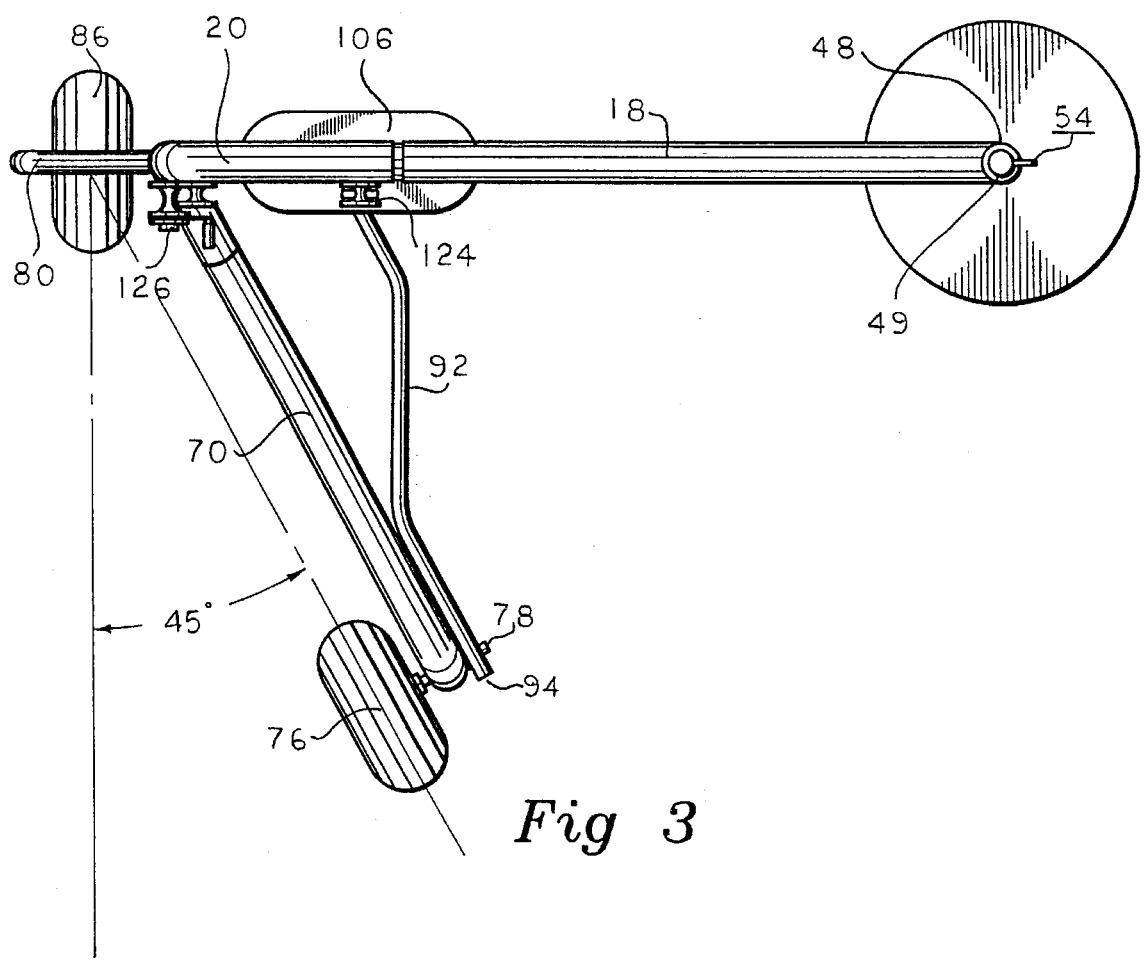
FIG. 3 is a plan view of the apparatus.
Figure 4:
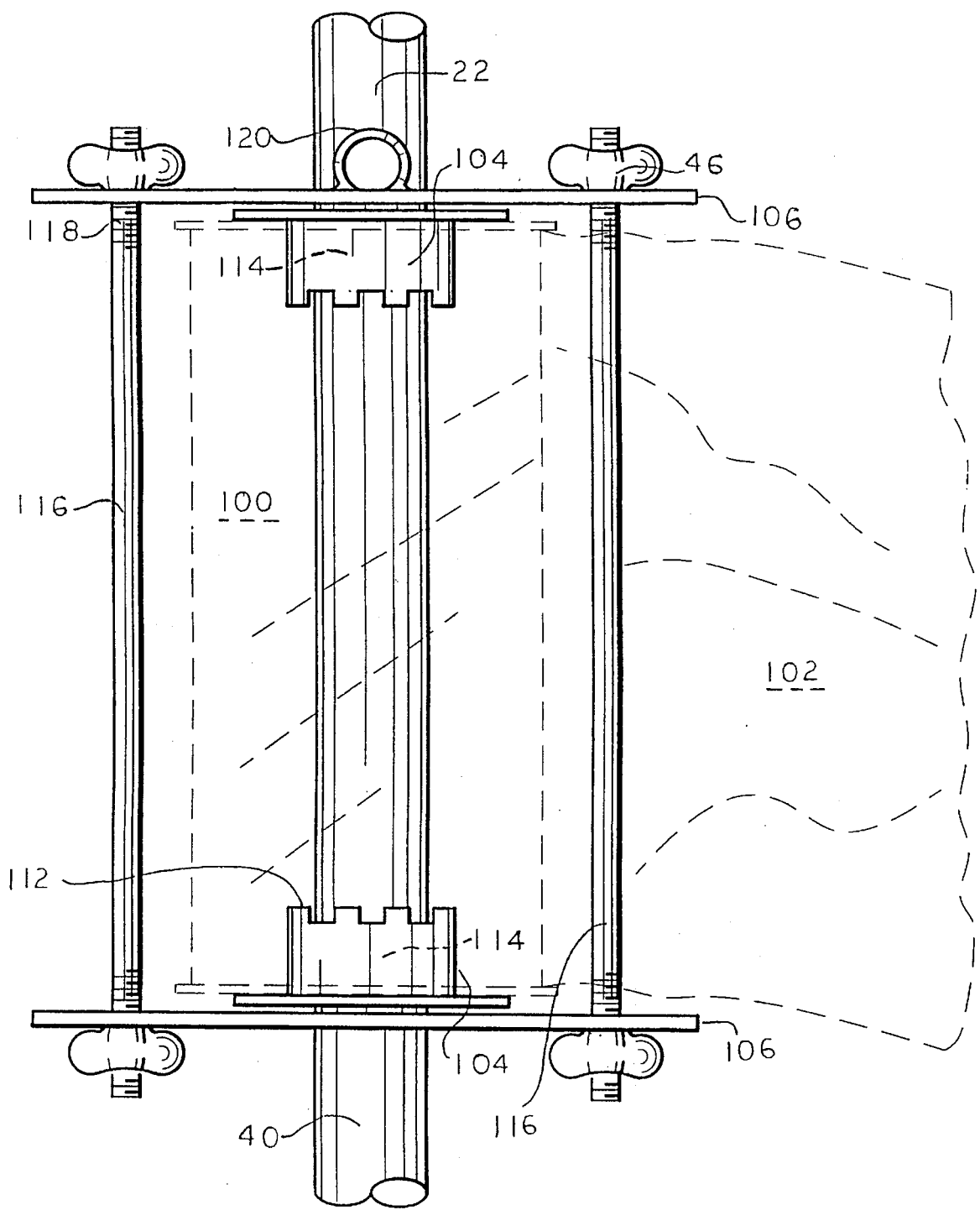
FIG. 4 is an enlarged view of the plastic sheet dispenser.

In FIG. 3, the roll 100 of plastic film or sheeting 102 is dispensed from a spool holder 104 which consists of two end plates 106 which are oblong in configuration (8 in. by 12 in.) to save weight. A centered PTFE washer 108 (2-3/16 in. diameter) is fastened to each end plate 106 which rotates about vertical leg members 22 and 40. Two metal spool brackets 110, each having tabs 112 which bend inward to confine a PTFE string packing 114 (⅜ inch in diameter), are provided to retain the roll 100 in the spool holder 104. Two metal rods 116 with threaded ends 118 span the end plates 106 and are positioned opposite each other at the extended ends of the oblong-shaped end plates 106. Wing nuts 46 are fastened to each threaded end 118. The two top wing nuts 46 serve an additional function in adjusting the tension or resistance applied to the roll 100 of plastic film 102 as the bale 60 is being wrapped. By increasing the pressure on the top end plate 106 with wing nuts 46, the plastic film 102 requires more force to spool out or unwind, thereby causing the plastic film to stretch and more tightly cover the bale 60. The plastic film 102 is preferably opaque and colored white, but either a green color which is aesthetically pleasing or a black color is contemplated and would absorb the sun's rays to melt off the accumulated ice and snow in the northern regions.

The top end plate 106 has an attachment piece or strap 120 to which a cord or string 122 is attached. Cord 122 travels over two pulleys 124 to the hand winder or crank 126. Alternatively, a six-inch long plastic tube or garden hose can be used as a hand brake 127 (shown in dashed lines) by hand-squeezing the plastic tube or garden hose through which cord 122 travels. The hand winder 126 can be friction geared to hold its position or its handle can be held by a loop of string attached to the horizontal portion of the second vertical leg member 80 (not shown). The pulleys 124 and hand winder 126 are attached on the same side of the apparatus 10 and are conveniently positionable on either side of the apparatus 10 when the direction of wrapping is reversed when desired.

The process of wrapping the bale 60 of hay with the plastic film 102 begins with the placing of bale 60 upright. Hay bales are typically four feet in height, five feet in diameter and weigh 650–1,000 pounds. The bales are bound by nylon twine to hold their barrel-like shape. Advantageously, apparatus 10 can readily perform the wrapping operation on uneven ground. The operator can tie the front end of the plastic film to one of the nylon strings on top of the bale. The spool holder 104 is held at the top position by the hand winder or crank 126 or by the hand brake. After two windings at the top of the bale, the spool holder 104 is lowered to cover another area of the bale 60 by dispensing more cord 122 by one revolution of the handle of the hand winder 126 at a time until the bottom of the bale is reached. The bottom region is double-wrapped and the end of the plastic film either tied or taped down, or simply pressed down on the underlying plastic film and held there by inherent electrostatic and tensile pressure characteristics of the stretched plastic film 102.

If the hand brake is utilized, the hand brake which can be a section of garden hose, is squeezed at intervals to wrap at certain levels such as at the top and bottom portions of the bale. In between the ends of the bale, experience will guide the operator in overlapping the wrapping sufficiently to prevent gaps in the wrapping.

This wrapping operation can be performed by one operator in less than a minute with a plastic film 20 to 30 inches in width. The apparatus 10 weighing 30 to 35 lbs. is moved readily to another bale of hay by lifting up the front wheel 76. If the apparatus 10 is to be transported great distances, it can readily be dismantled as shown in FIG. 5 and packaged with circular plate 54 and dismantled spool holder 104 positioned between the tubular members.

The assembled apparatus 10 can have the following exemplary dimensions: height range, 40–60 inches; width range, 48–60 inches; weight range, 30–35 lbs.; pneumatic tires, size 400×8, 8 in. hub; and the inclined third leg member 70 angled 45 degrees downward from the first vertical leg member 66 of the 3-legged wheeled member 44.

It is to be understood that the present invention is not limited to the sole embodiment described above, but encompasses any and all embodiments within the scope of the following claims.

I claim:

1. A round bale wrapping apparatus which is light-weight, portable by hand, and adjustable in height and length, comprising:

a hay bale holder including a circular plate having a centered spear adjustable in depth of penetration and multiple shorter spikes positioned proximate to the periphery of the circular plate and extendable into a round hay bale;

a segmented tubular main support member including a horizontal extendible member having at one end a support means for said circular plate, and an elbowed member having a first and a second height-adjustable vertical leg member, wherein said segmented tubular main support member defines a longitudinal axis of said wrapping apparatus;

a straight vertical leg member cooperating with said first height-adjustable vertical leg member;

a roll holder having tensioning means and vertical movement control means for a roll of covering material contained within and positioned slidably on said straight vertical leg member;

a three-legged vertical member having a first vertical leg member and a second vertical leg member, which second vertical leg member cooperates with said second height-adjustable vertical leg member at an upper end, and said first and second vertical leg members cooperate to support a first wheel at each lower end, said first and second vertical legs being aligned with said longitudinal axis; and a third inclined leg member of said three-legged vertical member extending in a direction perpendicular to said longitudinal axis and downward from an upper portion of said first vertical leg member at an acute angle, said third inclined leg member supporting a second wheel; whereby wrapping of the hay bale is enabled by lowering said roll holder as the apparatus is wheeled around the hay bale.

2. The wrapping apparatus according to claim 1, wherein said centered spear is metal and secured on said circular plate which is metal by a metal collar and setscrew.

3. The wrapping apparatus according to claim 1, wherein said multiple shorter spikes comprise three metal spikes of equal length and diameter positioned equidistantly from each other and are welded to the circular plate which is metal.

4. The wrapping apparatus according to claim 1, wherein said roll holder further comprises two oblong end plates fastened by two vertical rods having fastening means at their ends, whereby the dispensing of the roll is controlled by the tension applied by adjustment of the fastening means.

5. The wrapping apparatus according to claim 4, wherein each of said oblong end plates of said roll holder includes a spool bracket which friction fits a core of the roll.

6. The wrapping apparatus according to claim 5, wherein each said spool bracket contains tabs bent inward.

7. The wrapping apparatus according to claim 6, wherein said bent inward tabs confine a plastic string packing.

8. The wrapping apparatus according to claim 1, wherein said circular plate is prevented from rising from its support means by a plate collar and setscrew attached to said spear.

9. The wrapping apparatus according to claim 1, wherein the hay bale holder, the segmented tubular main support member, the roll holder, the three-legged vertical member, the first wheel, and the second wheel can be disassembled, wrapped for transport, and weigh less than 35 lbs.

10. The wrapping apparatus according to claim 1, wherein said first and second wheels are offset 45 degrees from each other in a direction which enables rotation of said wrapper apparatus about the round hay bale.

11. The wrapping apparatus according to claim 1, wherein said support means for said circular plate is a ring including therein a plastic bushing through which the spear extends and revolves.

12. The wrapping apparatus according to claim 1, wherein said first wheel and said second wheel are height-adjustable by positioning axles of said wheels in any one of a series of aligned throughbores in all leg members of said three-legged vertical member.

13. The wrapping apparatus according to claim 12, wherein said series of aligned throughbores are further supported by brackets having aligned throughbores.

14. The wrapping apparatus according to claim 1, wherein the vertical movement of said roll holder is controlled by a cord attached to the upper end plate and extends over pulleys to a hand winder, wherein the pulleys and hand winder are positioned on one side of the wrapper apparatus and removably fastened.

15. The wrapping apparatus according to claim 14, wherein said pulleys and said hand winder are removably positioned on either side of the wrapper apparatus, whereby rotation of the wrapping apparatus can be reversed for any hay bale.

16. The wrapping apparatus according to claim 14, wherein the hay bale holder, the segmented tubular main support member, the roll holder, the three-legged vertical member, the first wheel, the second wheel, the pulleys, the cord, and the hand winder can be disassembled, wrapped for transport, and weigh less than 35 lbs.

17. The wrapping apparatus according to claim 14, wherein a bent strut member is attached between the straight vertical leg member and the third inclined leg member of the three-legged main support member.

18. The wrapping apparatus according to claim 17, wherein the hay bale holder, the segmented tubular main support member, the roll holder, the three-legged vertical member, the bent strut member, the first wheel, the second wheel, the pulleys, the cord, and the hand winder can be disassembled, wrapped for transport, and weigh less than 35 lbs.

19. The wrapping apparatus according to claim 1, wherein the vertical movement control means of said roll holder is controlled by a cord attached to an upper end plate and extends over at least one pulley attached to the segmented tubular main support member, and to a hand brake comprising a plastic tube surrounding said cord.

20. The wrapping apparatus according to claim 19, wherein the hay bale holder, the segmented tubular main support member, the roll holder, the three-legged vertical member, the first wheel, the second wheel, the at least one pulley, the cord, and the hand brake can be disassembled, wrapped for transport, and weigh less than 35 lbs.

* * * * *